US012690028B2

(12) United States Patent
Zuo et al.

(10) Patent No.: US 12,690,028 B2
(45) Date of Patent: Jul. 21, 2026

(54) METHOD AND DEVICE FOR REPEATEDLY TRANSMITTING DATA CHANNEL

(71) Applicant: GUANGDONG OPPO MOBILE TELECOMMUNICATIONS CORP., LTD., Dongguan (CN)

(72) Inventors: Zhisong Zuo, Dongguan (CN); Weijie Xu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 243 days.

(21) Appl. No.: 18/215,552

(22) Filed: Jun. 28, 2023

(65) Prior Publication Data

US 2023/0362915 A1     Nov. 9, 2023

Related U.S. Application Data

(63) Continuation of application No. PCT/CN2020/141059, filed on Dec. 29, 2020.

(51) Int. Cl.
*H04W 72/1263* (2023.01)
*H04L 1/18* (2023.01)

(52) U.S. Cl.
CPC ........... *H04W 72/1263* (2013.01); *H04L 1/18* (2013.01)

(58) Field of Classification Search
CPC .... H04W 72/1263; H04L 1/18; H04L 1/0041; H04L 1/0057; H04L 5/0005; H04L 5/0044; H04L 1/1819; H04L 1/1864; H04L 1/1896; H04L 1/0003; H04L 1/0009; H04L 1/08
See application file for complete search history.

(56) References Cited

U.S. PATENT DOCUMENTS

| | | | | |
|---|---|---|---|---|
| 2019/0349116 | A1 | 11/2019 | Hosseini et al. | |
| 2020/0162208 | A1 | 5/2020 | Moon et al. | |
| 2022/0045789 | A1* | 2/2022 | Karmoose | H04L 1/0041 |
| 2024/0049234 | A1* | 2/2024 | Yoshimura | H04L 5/0053 |

FOREIGN PATENT DOCUMENTS

| | | |
|---|---|---|
| CN | 110278614 A | 9/2019 |
| CN | 110830183 A | 2/2020 |
| CN | 110912586 A | 3/2020 |
| CN | 111418248 A | 7/2020 |

(Continued)

OTHER PUBLICATIONS

Second Office Action issued by the European Patent Office for Application No. 20967454.8 mailed on Mar. 13, 2025.

(Continued)

*Primary Examiner* — Yaotang Wang

(74) *Attorney, Agent, or Firm* — Sheppard, Mullin, Richter & Hampton LLP

(57) ABSTRACT

A method and device for repeatedly transmitting data channel are provided. The method includes: determining a transport block size corresponding to the data channel according to a first slot repetition factor and/or a number of time-domain symbols in slots for repeated transmission of the data channel; obtaining encoded information bits by encoding the data channel according to the transport block size corresponding to the data channel; and mapping the encoded information bits onto a plurality of slots.

18 Claims, 2 Drawing Sheets

100

(56)                    References Cited

FOREIGN PATENT DOCUMENTS

| | | |
|---|---|---|
| CN | 111525979 A | 8/2020 |
| CN | 111586845 A | 8/2020 |
| CN | 111756476 A | 10/2020 |
| WO | 2020164102 A1 | 8/2020 |
| WO | 2020165835 A1 | 8/2020 |

OTHER PUBLICATIONS

Office Action issued by the European Patent Office for Application No. 20967454.8 mailed on Oct. 23, 2024.
Office Action issued by the Chinese Patent Office for Application No. 202080107050.3 mailed on Sep. 25, 2024.
International Search Report and Written Opinion dated Sep. 8, 2021 in International Application No. PCT/CN2020/141059. English translation attached.
Vivo. "3GPP TSG RAN WG1 #103-e R1-2007680" Discussion on solutions for PUSCH coverage enhancement, Oct. 17, 2020 (Oct. 17, 2020), p. 4.
"3rd Generation Partnership Project;Technical Specification Group Radio Access Network;NR;Physical layer procedures for data(Release 16)" 3GPP TS 38.214 V16.2.0,Mar. 2020,section 6.1.2.
China Telecom, "New SID on NR coverage enhancement" 3GPP TSG RAN Meeting #86 RP-193240, Dec. 2019, Section : Justification and Objectives.
Second Office Action issued by the Chinese Patent Office for Application No. 202080107050.3 mailed on Nov. 26, 2024.
Extended European Search Report dated Jan. 19, 2024 received in European Patent Application No. EP20967454.8.
Wilus Inc:"Discussion on potential techniques for PUSCH coverage enhancement" 3GPP Draft: R1-2008729,3rd Generation Partnership Project (3GPP), Mobile Competence Centre; 650 Route Des Lucioles; F-06921 Sophia-Antipolis Cedex; France vol. RAN WG1, No. e-Meeting; Oct. 26, 2020-Nov. 13, 2020, Nov. 1, 2020 (Nov. 1, 2020), XP052350660.
Anonymous:"3rd Generation Partnership Project; Technical Specification Group Radio Access Network; NR; Physical layer procedures for data (Release 15)", 3GPP Standard;Technical Specification, 3GPP TS 38.214, 3rd Generation Partnership Project (3GPP) Mobile Competence Centre :650Route Des Lucioles :F-06921 Sophia-Antipolis Cedex:France, vol. RAN WG1, No. V15.2.0,Jun. 29, 2018 (Jun. 29, 2018), pp. 1-95, XP051474491.
Office Action issued by the European Patent Office for Application No. 20967454.8 mailed on Oct. 10, 2025.
Office Action issued by the European Patent Office for Application No. 20967454.8 mailed on Mar. 19, 2026, 7 pages.
3rd Generation Partnership Project; Technical Specification Group Radio Access Network; NR; Physical channels and modulation (Release 15); 3GPPTS 38.211 V1.3.0 (Dec. 2017), 73 pages.

* cited by examiner

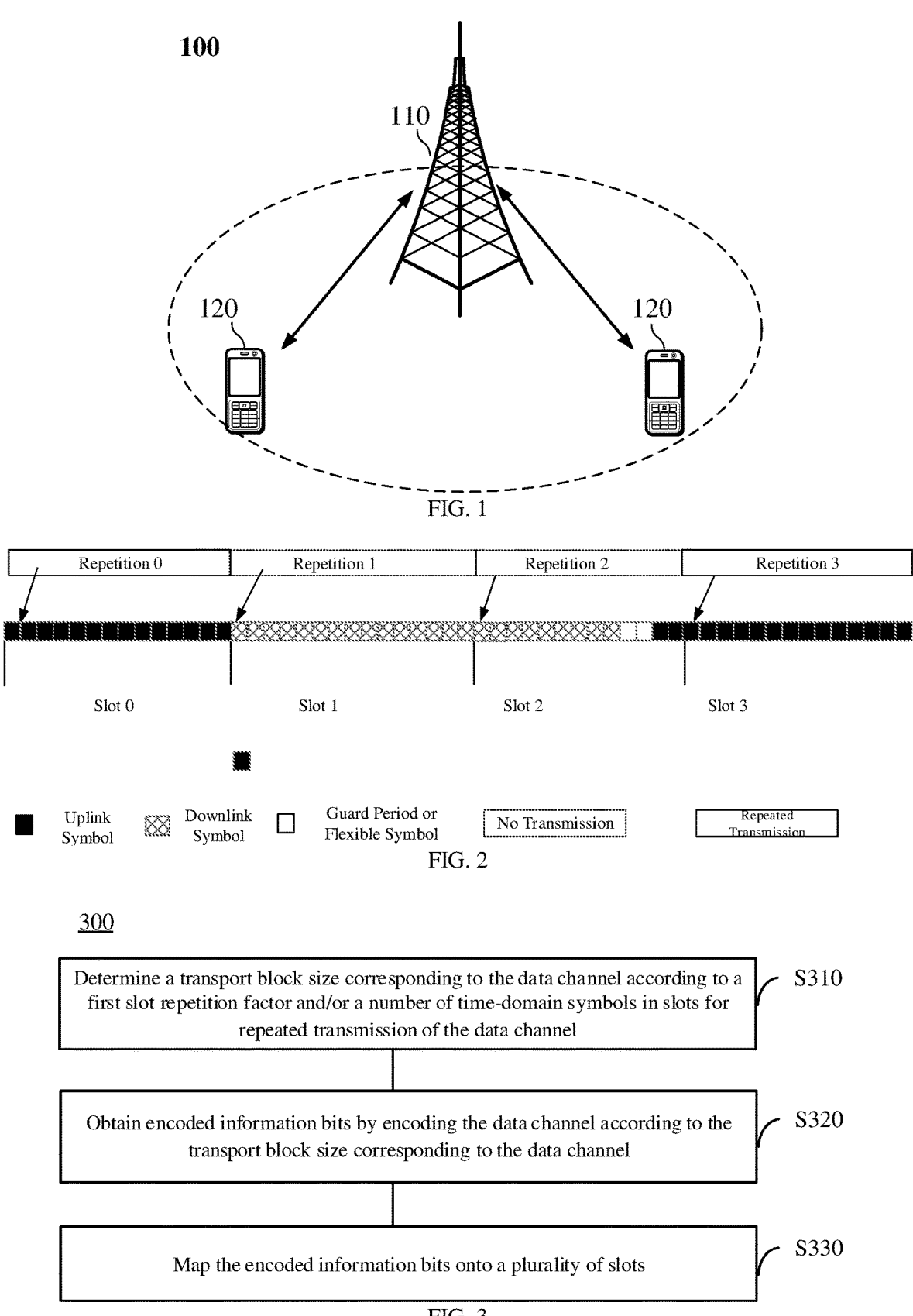

| Repetition 0 | Repetition 1 | Repetition 2 | Repetition 3 |

Slot 0     Slot 1     Slot 2     Slot 3

Uplink Symbol     Downlink Symbol     Guard Period or Flexible Symbol     No Transmission     Repeated Transmission

Determine a transport block size corresponding to the data channel according to a first slot repetition factor and/or a number of time-domain symbols in slots for repeated transmission of the data channel    S310

Obtain encoded information bits by encoding the data channel according to the transport block size corresponding to the data channel    S320

Map the encoded information bits onto a plurality of slots    S330

FIG. 3

METHOD AND DEVICE FOR REPEATEDLY TRANSMITTING DATA CHANNEL

CROSS-REFERENCE TO RELATED APPLICATIONS

This application is a continuation of International Application No. PCT/CN2020/141059 filed on Dec. 29, 2020, the entire disclosure of which is incorporated herein by reference.

TECHNICAL FIELD

The embodiments of the present disclosure relate to a field of communication technology, and more particularly, to a method and device for repeatedly transmitting data channel.

BACKGROUND

In the New Radio (NR) system, a network device can configure a terminal device to use multi-slot repeated transmission to improve transmission coverage. In encoding and mapping of a data channel, it is first needed to determine a Transport Block Size (TBS) corresponding to the data channel. In the related art, when determining the TBS corresponding to the data channel, only Orthogonal Frequency-Division Multiplexing (OFDM) symbol allocation in one slot is considered. When multi-slot repeated transmission needs to be adapted to flexible slot ratios, this method for determining the TBS may cause the determined TBS to be too large or too small, and in coverage-limited cases, in order to obtain a specific bit rate, more Physical Resource Blocks (PRBs) need to be allocated, resulting in degraded resource utilization.

SUMMARY

The present disclosure provides a method and device for repeatedly transmitting data channel, capable of improving resource utilization.

In a first aspect, a method for repeatedly transmitting data channel is provided. The method includes: determining a transport block size corresponding to the data channel according to a first slot repetition factor and/or a number of time-domain symbols in slots for repeated transmission of the data channel; obtaining encoded information bits by encoding the data channel according to the transport block size corresponding to the data channel; and mapping the encoded information bits onto a plurality of slots.

In a second aspect, a device for repeatedly transmitting data channel is provided. The device is configured to perform the method according to the above first aspect or any implementation thereof. In particular, the device includes one or more functional modules configured to perform the method according to the above first aspect or any implementation thereof.

In a third aspect, a device for repeatedly transmitting data channel is provided. The device includes a processor and a memory. The memory has a computer program stored thereon, and the processor is configured to invoke and execute the computer program stored in the memory to perform the method according to the above first aspect or any implementation thereof.

In a fourth aspect, a chip is provided. The chip is configured to perform the method according to any of the above first aspect or any implementation thereof.

In particular, the chip includes a processor configured to invoke and execute a computer program from a memory, to cause a device provided with the apparatus to perform the method according to any of the above first or any implementation thereof.

In a fifth aspect, a computer-readable storage medium is provided. The computer-readable storage medium stores a computer program that causes a computer to perform the method according to any of the above first aspect or any implementation thereof.

In a sixth aspect, a computer program product is provided. The computer program product includes computer program instructions that cause a computer to perform the method according to any of the above first aspect or any implementation thereof.

In a seventh aspect, a computer program is provided. The computer program, when executed on a computer, causes the computer to perform the method according to any of the above first aspect or any implementation thereof.

With the above technical solutions, when a second slot repetition factor is configured, a TBS can be determined according to a first slot repetition factor and/or a number of time-domain symbols in slots actually used for repeated transmission of the data channel. This is equivalent to considering time-domain symbol allocation across multiple slots to calculate the TBS, such that the size of the calculated TBS can be increased. Further, in order to obtain a same bit rate, only a small number of PRBs need to be allocated, thereby improving resource utilization.

BRIEF DESCRIPTION OF DRAWINGS

FIG. 1 is a schematic diagram showing an architecture of a communication system according to an embodiment of the present disclosure.

FIG. 2 is a schematic diagram showing a multi-slot repeated transmission according to an embodiment of the present disclosure.

FIG. 3 is a schematic interaction diagram illustrating a method for repeatedly transmitting data channel according to an embodiment of the present disclosure.

DESCRIPTION OF EMBODIMENTS

Figure 4:
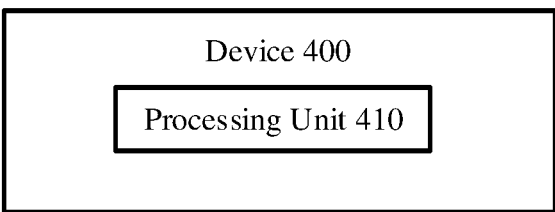
FIG. 4 is a schematic block diagram of a device for repeatedly transmitting data channel according to an embodiment of the present disclosure.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the $5^{th}$ Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device.

The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device having a wireless communication function, a computing device, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a wireless terminal device in self driving, a wireless terminal device in remote medical, a wireless terminal device in smart grid, a wireless terminal device in transportation safety, a wireless terminal device in smart city, or a wireless terminal device in smart home.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Exemplarily, FIG. 1 shows an architecture of a communication system 100 where an embodiment of the present disclosure can be applied. The communication system 100 may include a network device 110 which may be a device communicating with a terminal device 120 (or referred to as communication terminal or terminal). The network device 110 may provide communication coverage for a particular geographic area, and may communicate with terminal devices located within the coverage.

FIG. 1 exemplarily shows one network device and two terminal devices. Optionally, the communication system 100 may include multiple network devices, and the coverage of each network device may include other numbers of terminal devices. The embodiment of the present disclosure is not limited to this.

Optionally, the wireless communication system 100 may also include other network entities such as a network controller or a Mobility Management Entity (MME). The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the network device 110 and the terminal device 120 with communication functions. The network device 100 and the terminal device 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

In the embodiments of the present disclosure, "predefined" may implemented as pre-stored in one or more devices (for example, including a terminal device and a network device) corresponding codes, tables or other means that can be used to indicate related information, and the present disclosure is not limited to its specific implementation. For example, "predefined" may refer to defined in protocols.

In the embodiments of the present disclosure, "protocols" may refer to standard protocols in the communication field, including e.g., the LTE protocol, the NR protocol, and related protocols applied in future communication systems. The present disclosure is not limited to any of these examples.

In the NR system, multi-slot PUSCH and PDSCH transmissions can be performed with uplink and downlink aggregation factors. A terminal device can improve the coverage of a single transmission by means of multi-slot repeated transmission.

Since the aggregation factor is semi-statically configured, the same Demodulation Reference Signal (DMRS) time domain structure is used in each slot when a PUSCH/PDSCH transmission is repeated.

The NR system supports flexible slot ratio. A slot can have some uplink time-domain symbols and some downlink time-domain symbols. Physical Uplink Control Channel (PUCCH) and Physical Uplink Shared Channel (PUSCH)

are only transmitted in the uplink time-domain symbols, and Physical Downlink Control Channel (PDCCH) and Physical Downlink Shared Channel (PDSCH) are only transmitted in the downlink time-domain symbols. Taking the transmission of PUSCH as an example, for multi-slot repeated transmission, the start position and number of available symbols in a slot for PUSCH transmission should meet the resource configuration for PUSCH; or otherwise the terminal device omits the repeated transmission on this slot.

FIG. 2 shows a schematic diagram of multi-slot repeated transmission. As shown in FIG. 2, since the symbol configurations in Slot 1 and Slot 2 are basically downlink time-domain symbols, the number of uplink time-domain symbols does not meet the transmission requirements. Therefore, the terminal device omits transmission in Slot 1 and Slot 2, and performs repeated transmission in Slot 0 and Slot 3 only. Therefore, when the terminal device is configured to perform four repeated transmissions, the terminal device actually performs only two repeated transmissions.

When performing multi-slot repeated transmission, it is needed to first determine a Transport Block Size (TBS) corresponding to a data channel. In the related art, when determining the TBS, only OFDM symbol allocation in one slot is considered. This design requires OFDM symbols in all slots are exactly the same.

When multi-slot repeated transmission needs to be adapted to flexible slot ratios, this method for determining the TBS may cause the determined TBS to be too large or too small, and in coverage-limited cases, in order to obtain a specific bit rate, more Physical Resource Blocks (PRBs) need to be allocated, resulting in degraded resource utilization. Therefore, how to determine the TBS size in the multi-slot repeated transmission to improve resource utilization is a problem to be solved.

In order to facilitate understanding of the technical solutions of the embodiments of the present disclosure, the technical solutions of the present disclosure will be described in detail below with reference to specific examples. The above related technologies as optional solutions may be arbitrarily combined with the technical solutions of the embodiments of the present disclosure, and all of these combinations are to be encompassed by the scope of the embodiments of the present disclosure. The embodiments of the present disclosure include at least part of the following content.

FIG. 3 is a schematic flowchart illustrating a method 300 for repeatedly transmitting data channel according to an embodiment of the present disclosure. The method 300 can be performed by a terminal device or a network device in the communication system shown in FIG. 1. In the following, the embodiments of the present disclosure will be described where the method is performed by a terminal device, and the actions of the network devices will be similar, so for the sake of brevity, details thereof will be omitted.

As shown in FIG. 3, the method 300 includes the following content.

At S310, a transport block size corresponding to the data channel is determined according to a first slot repetition factor and/or a number of time-domain symbols in slots for repeated transmission of the data channel.

At S320, encoded information bits are obtained by encoding the data channel according to the transport block size corresponding to the data channel.

At S330, the encoded information bits are mapped onto a plurality of slots.

It can be appreciated that the embodiments of the present disclosure may be applicable to determining a TBS for a data channel, or may be applicable to determining a TBS for another channel, such as a control channel, etc., and the present disclosure is not limited to this.

Optionally, in some embodiments, the data channel may be an uplink data channel, such as a Physical Uplink Shared channel (PUSCH), or may be a downlink data channel, such as a Physical Downlink Shared Channel (PDSCH).

Optionally, in some embodiments, the time-domain symbols may refer to OFDM symbols, and a number of time-domain symbols may refer to the number of OFDM symbols.

In some embodiments of the present disclosure, the terminal device may determine the TBS for the data channel according to the first slot repetition factor and/or the number of time-domain symbols in the slots for repeated transmission of the data channel when the terminal device is configured with a second slot repetition factor. The second slot repetition factor may indicate a number of slots for repeated transmission of the data channel.

Optionally, the second slot repetition factor may be configured by a network device. For example, the network device may configure the second slot repetition factor via Radio Resource Control (RRC) signaling or other signaling, and the present disclosure is not limited to this.

Optionally, in some embodiments, the second slot repetition factor may correspond to the aggregation factor as described above.

Optionally, the number of slots for the terminal device to repeatedly transmit the data channel may be determined according to the second slot repetition factor, that is, the number of slots may be determined according to the second slot repetition factor.

Optionally, in some embodiments, the number of time-domain symbols in the slots for repeated transmission of the data channel may refer to a number of time-domain symbols in the slots actually used for repeated transmission of the data channel.

It can be known from the above description that after introduction of the flexible slot structure, the uplink time-domain symbols in each slot are not fixed, and the embodiment of the present disclosure determines the TBS according to the number of time-domain symbols in the slots actually used for repeated transmission of the data channel, so as to dynamically determine the number of time-domain symbols used to transmit the data channel according to the flexible slot structure, and further dynamically determine the TBS corresponding to the data channel, thereby achieving better scheduling of TB s in the multi-slot repetition scenario, and ensuring coverage performance of the TBs.

Optionally, in some embodiments, the first slot repetition factor may be smaller than or equal to the second slot repetition factor.

Optionally, in some embodiments, the first slot repetition factor may be determined according to the second slot repetition factor.

For example, the first slot repetition factor may be the second slot repetition factor multiplied by a first coefficient, the first coefficient being a positive number smaller than or equal to 1.

Optionally, in some embodiments, the first slot repetition factor may be configured by a network device.

For example, the network device may configure the first slot repetition factor via a downlink message or signaling such as RRC signaling or Downlink Control Information (DCI).

Optionally, in some embodiments, the first slot repetition factor may be determined according to the number of slots actually used for repeated transmission of the data channel. For example, in the example shown in FIG. 2, the second slot repetition factor is 4, and the number of slots used for multi-slot transmission is 2, then the first slot repetition factor may be 2.

Optionally, in some embodiments, S310 may include:

determining the transport block size corresponding to the data channel according to the first slot repetition factor and a scheduling parameter.

In some embodiments, the scheduling parameter may include at least one of:

a target number of Resource Elements (REs) $N_{RE}$, a coding rate R, a modulation order $Q_m$, or a number of transmission layers v.

Optionally, the scheduling parameter may be included in Downlink Control Information (DCI) scheduling the data channel.

Optionally, in some embodiments, the operation of determining the transport block size corresponding to the data channel according to the first slot repetition factor and the scheduling parameter may include:

determining an intermediate number of information bits according to the first slot repetition factor and the scheduling parameter; and determining the transport block size corresponding to the data channel according to the intermediate number of information bits.

In the following, some implementations of determining the intermediate number of information bits according to the first slot repetition factor and the scheduling parameter will be described with reference to specific embodiments.

Embodiment 1

The terminal device can determine the intermediate number, $N_{info}$, of information bits according to the following Equation (1):

$$N_{info} = N_{RE} \cdot R \cdot Q_m \cdot v \cdot X, \tag{1}$$

where $N_{RE}$ represents the target number of REs, R represents the coding rate, $Q_m$ represents the modulation order, v represents the number of transmission layers, and X represents the first slot repetition factor.

In Embodiment 1, the target number, $N_{RE}$, of REs can be determined according to the following Equation (2):

$$N_{RE} = \min(N, N'_{RE}) \cdot n_{PRB}, \tag{2}$$

where N represents a first reference RE number threshold, $N'_{RE}$ represents a reference number of available REs in one slot, $n_{PRB}$ represents a number of Resource Blocks (RBs) allocated by a network device, and min represents taking a minimum value.

Optionally, the first reference RE number threshold may be 156, or other values, and the present disclosure is not limited to this.

In some embodiments, the reference number, $$N'_{RE},$$

of available REs in one slot can be determined using the following Equation (3):

$$N'_{RE} = N^{RB}_{sc} \cdot N^{sh}_{symb} - N^{PRB}_{DMRS} - N^{PRB}_{oh}, \qquad (3)$$

where $$N^{RB}_{sc}$$

represents a number of subcarriers on each RB, $$N^{sh}_{symb}$$

represents a number of time-domain symbols in each slot, $$N^{PRB}_{DMRS}$$

represents a number of REs occupied by a Demodulation Reference Signal (DMRS) in each RB, and $$N^{PRB}_{oh}$$

represents a number of overhead REs.

Optionally, in some embodiments, $$N^{RB}_{sc}, N^{sh}_{symb}, \text{ and } N^{PRB}_{DMRS}$$

can be obtained from the scheduling information carried by the DCI.

Optionally, in some embodiments, $$N^{PRB}_{oh}$$

may be configured by a network device, or may be a fixed value.

Optionally, in some embodiments, X may be a positive integer greater than 1, that is, the first slot repetition factor is a positive integer.

Therefore, in Embodiment 1, the TBS corresponding to the data channel is calculated according to Equation (1), i.e., the TBS is calculated while considering the OFDM symbol allocations in multiple slots, which can increase the size of the calculated TBS. Further, in order to obtain a same bit rate, only a small number of PRBs need to be allocated, thereby improving resource utilization.

Embodiment 2

The operation of determining the intermediate number of information bits according to the first slot repetition factor and the scheduling parameter may include:
    determining the target number, $N_{RE}$, of REs according to the first slot repetition factor X; and determining the intermediate number of information bits according to the target number of REs and the scheduling parameter.

In some embodiments, the operation of determining the target number, $N_{RE}$, of REs according to the first slot repetition factor includes:
    determining the target number, $N_{RE}$, of REs according to the first slot repetition factor X and a reference number, $$N'_{RE},$$

of available REs in one slot.

As an implementation, the terminal device may determine the target number, $N_{RE}$, of REs according to Equation (4):

$$N_{RE} = X \cdot \min(N, N'_{RE}) \cdot n_{PRB}, \qquad (4)$$

where X represents the first slot repetition factor, N represents a first reference RE number threshold, $n_{PRB}$ represents a number of Resource Blocks (RBs) allocated by a network device, and $$N'_{RE}$$

represents the reference number of available REs in one slot.

Optionally, the first reference RE number threshold may be 156, or other values, and the present disclosure is not limited to this.

Optionally, in some embodiments, the terminal device may determine the reference number, $$N'_{RE},$$

of available REs in the one slot according to the above Equation (3).

Further, the terminal device may determine the intermediate number $N_{info}$ of information bits according to Equation (5):

$$N_{info} = N_{RE} \cdot R \cdot Q_m \cdot v, \qquad (5)$$

where $N_{RE}$ indicates the target number of REs determined according to Equation (4), R represents the coding rate, $Q_m$ represents the modulation order, and v represents the number of transmission layers.

Therefore, in this implementation, the target number, $N_{RE}$, of REs can be calculated according to Equation (4), i.e., the target number of REs can be calculated according to the first slot repetition factor. That is, the TBS is calculated while considering the OFDM symbol allocations in multiple slots, which can increase the size of the calculated TBS. Further, in order to obtain a same bit rate, only a small number of PRBs need to be allocated, thereby improving resource utilization.

In other embodiments, the operation determining the target number, $N_{RE}$, of REs according to the first slot repetition factor may include:

the terminal device determining a reference number of available REs in the slots for repeated transmission of the data channel according to the first slot repetition factor and the number of time-domain symbols in the slots for repeated transmission of the data channel; and determining the target number of REs according to the reference number of available REs in the slots for repeated transmission of the data channel.

In some embodiments of the present disclosure, the number of time-domain symbols in the slots for repeated transmission of the data channel may refer to the number of available time-domain symbols in the slots for actually transmitting the data channel, or the number of time-domain symbols actually used for transmitting the data channel in the slots for actually transmitting the data channel.

In the embodiment of the present disclosure, the TBS is determined by considering the number of time-domain symbols in the slots actually used for repeated transmission of the data channel, such that the number of time-domain symbols used for transmission of the data channel can be dynamically determined according to the flexible slot structure, which is capable of overcoming the problem in the related art that the TBS determined according to the number of time-domain symbols in one single slot may be too large or too small. Since the TBS is determined by considering the number of time-domain symbols in multiple slots, the size of the calculated TBS can be increased. Further, in order to obtain a same bit rate, only a small number of PRBs need to be allocated, thereby improving resource utilization.

Moreover, by determining the TBS while considering the number of time-domain symbols in the slots for actually transmitting the data channel, it can be more accurately applied to the adaptive repeated transmission of the data channel with the flexible slot structure, and better solve the problem of insufficient coverage of the data channel.

As an implementation, the terminal device may determine the reference number, $$N'_{RE},$$

of available REs in the slots for repeated transmission of the data channel according to the following Equation (6):

$$N''_{RE} = \sum_{i=0}^{X-1} \left( N_{sc}^{RB} \cdot N_{symb,i}^{sh} - N_{DMRS,i}^{PRB} - N_{oh}^{PRB} \right),$$ (6)

where X represents the first slot repetition factor, $$N_{sc}^{RB}$$

represents a number of subcarriers on each RB, $$N_{symb,i}^{sh}$$

represents a number of time-domain symbols in the i-th slot for repeated transmission of the data channel, $$N_{DMRS,i}^{PRB}$$

represents a number of REs occupied by a DMRS in each RB in the i-th slot for repeated transmission of the data channel, and $$N_{oh}^{PRB}$$

represents a number of overhead REs.

In this implementation, $$N'_{RE}$$

is determined in a different way from the previous embodiment. The number of time-domain symbols and the number of DMRSs in the slots for actually transmitting the data channel are considered, and conversion of the OFDM symbols in the DMRSs and data (payload) in the slots for actual repeated transmission of the data channel is considered. The reference number of available REs calculated in this way is more accurate.

Therefore, in the embodiment of the present disclosure, when calculating the transmission block size, the number of RE resources used for actual repeated transmission of the data channel is determined according to the slot configuration of the frame structure and the second slot repetition factor, capable of ensuring reasonable resource allocation and encoding parameters such as coding rate.

Further, in some embodiments, the target number, $N_{RE}$, of REs may be determined according to Equation (7):

$$N_{RE} = \min(N', N'_{RE}) \cdot n_{PRB},$$ (7)

where N' represents a second reference RE number threshold, $n_{PRB}$ represents a number of RBs allocated by a network device, and $$N''_{RE}$$

represents the reference number of available REs in the slots for repeated transmission of the data channel as determined according to Equation (6).

Optionally, in some embodiments, the second reference RE number threshold may be 156, or 156*X.

That is, the target number, $N_{RE}$, of REs can be determined according to the following Equation (8) or (9).

$$N_{RE} = \min(156 \cdot X, N'_{RE}) \cdot n_{PRB},$$ (8)

$$N_{RE} = \min(156, N'_{RE}) \cdot n_{PRB}.$$ (9)

Further, the terminal device may substitute Equation (7) into Equation (5) to obtain the intermediate number, $N_{info}$, of information bits.

Based on the above embodiments, the intermediate number, $N_{info}$, of information bits can be determined.

Further, in some embodiments, the terminal device may perform quantization and rounding on the intermediate number of information bits to determine the transport block size corresponding to the data channel.

For example, a transport block size in a list of transport block sizes that is not smaller than the intermediate number of information bits and has a smallest difference with the intermediate number of information bits may be determined as the transport block size corresponding to the data channel.

As an example, a list of TBSs is shown in Table 1. If the intermediate number of information bits determined according to the above embodiment is 101.9, the table can be searched for a TBS that is not smaller than 101.9 and is closest to 101.9, i.e., 104, as the TBS of the data channel.

TABLE 1

| Index | TBS |
|-------|------|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |

14

TABLE 1-continued

| Index | TBS |
|-------|------|
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Optionally, in some embodiments of the present disclosure, S320 may further include:

obtaining the encoded information bits by performing channel coding according to the transport block size corresponding to the data channel and a number of REs in a plurality of repeated data resources scheduled by a network device.

Optionally, the number of REs in the plurality of repeated data resources may be indicated in DCI from a network device.

In some embodiments, the number of bits after channel coding and rate matching corresponds to the number of REs.

In an embodiment of the present disclosure, the operation of mapping the encoded information bits onto the plurality of slots may include:

mapping one redundant version of the encoded information bits successively onto the plurality of slots.

That is, in the embodiment of the present disclosure, only one redundant version can be mapped when encoding and mapping is performed, and the one redundant version can be mapped successively onto the plurality of slots. That is, the information bits mapped onto the plurality of slots may constitute one redundant version.

Optionally, the plurality of slots may be slots for actually transmitting the data channel.

For example, one redundancy version may be mapped onto REs of data resources scheduled in the slots for actual repeated transmission.

The method embodiments of the present disclosure have been described in detail above with reference to FIG. 3, and the apparatus embodiments of the present disclosure will be described in detail below with reference to FIG. 4 to FIG. 7. It can be appreciated that the apparatus embodiments and the method embodiments correspond to each other, and for similar descriptions, reference can be made to the method embodiments.

FIG. 4 shows a schematic block diagram of a device 400 for repeatedly transmitting data channel according to an embodiment of the present disclosure. As shown in FIG. 4, the device 400 includes:

a processing unit 410 configured to determine a transport block size corresponding to the data channel according to a first slot repetition factor and/or a number of time-domain symbols in slots for repeated transmission of the data channel;

obtain encoded information bits by encoding the data channel according to the transport block size corresponding to the data channel; and map the encoded information bits onto a plurality of slots.

Optionally, in some embodiments, the processing unit 410 may be further configured to:

determine the transport block size corresponding to the data channel according to the first slot repetition factor and a scheduling parameter.

Optionally, in some embodiments, the scheduling parameter may include at least one of:

a target number of Resource Elements (REs), a coding rate, a modulation order, or a number of transmission layers.

Optionally, in some embodiments, the processing unit 410 may be further configured to:

determine an intermediate number of information bits according to the first slot repetition factor and the scheduling parameter; and determine the transport block size corresponding to the data channel according to the intermediate number of information bits.

Optionally, in some embodiments, the processing unit 410 may be further configured to:

determine the intermediate number, $N_{info}$, of information bits according to:

$$N_{info} = N_{RE} \cdot R \cdot Q_m \cdot \upsilon \cdot X,$$

where $N_{RE}$ represents the target number of REs, R represents the coding rate, $Q_m$ represents the modulation order, v represents the number of transmission layers, and X represents the first slot repetition factor.

Optionally, in some embodiments, the processing unit 410 may be further configured to:

determine the target number of REs according to the first slot repetition factor; and determine the intermediate number of information bits according to the target number of REs and the scheduling parameter.

Optionally, in some embodiments, the processing unit 410 may be further configured to:

determine the target number of REs according to the first slot repetition factor and a reference number of available REs in one slot.

Optionally, in some embodiments, the processing unit 410 may be further configured to:

determine the target number, $N_{RE}$, of REs according to:

$$N_{RE} = X \cdot \min(N, N'_{RE}) \cdot n_{PRB},$$

where X represents the first slot repetition factor, N represents a first reference RE number threshold, $n_{PRB}$ represents a number of Resource Blocks (RBs) allocated by a network device, and

16

$$N'_{RE}$$

represents the reference number of available REs in one slot.

Optionally, the first reference RE number threshold may be 156.

Optionally, in some embodiments, the processing unit 410 may be further configured to:

determine the reference number, $$N'_{RE},$$

of available REs in one slot according to:

$$N'_{RE} = N_{sc}^{RB} \cdot N_{symb}^{sh} - N_{DMRS}^{PRB} - N_{oh}^{PRB},$$

where $$N_{sc}^{RB}$$

represents a number of subcarriers on each RB, $$N_{symb}^{sh}$$

represents a number of time-domain symbols in each slot, $$N_{DMRS}^{PRB}$$

represents a number of REs occupied by a Demodulation Reference Signal (DMRS) in each RB, and $$N_{oh}^{PRB}$$

represents a number of overhead REs.

Optionally, in some embodiments, the processing unit 410 may be further configured to:

determine a reference number of available REs in the slots for repeated transmission of the data channel according to the first slot repetition factor and the number of time-domain symbols in the slots for repeated transmission of the data channel; and determine the target number of REs according to the reference number of available REs in the slots for repeated transmission of the data channel.

Optionally, in some embodiments, the processing unit 410 may be further configured to:

determine the reference number, $$N''_{RE},$$

of available REs in the slots for repeated transmission of the data channel according to:

$$N''_{RE} = \sum_{i=0}^{X-1} \left( N_{sc}^{RB} \cdot N_{symb,i}^{sh} - N_{DMRS,i}^{PRB} - N_{oh}^{PRB} \right),$$

where X represents the first slot repetition factor, $$N_{sc}^{RB}$$

represents a number of subcarriers on each RB, $$N_{symb,i}^{sh}$$

represents a number of time-domain symbols in the i-th slot for repeated transmission of the data channel, $$N_{DMRS,i}^{PRB}$$

represents a number of REs occupied by a DMRS in each RB in the i-th slot for repeated transmission of the data channel, and $$N_{oh}^{PRB}$$

represents a number of overhead REs.

Optionally, in some embodiments, the processing unit 410 may be further configured to:

determine the target number, $N_{RE}$, of REs according to:

$$N_{RE} = \min(N', N'_{RE}) \cdot n_{PRB},$$

where N' represents a second reference RE number threshold, $n_{PRB}$ represents a number of RBs allocated by a network device, and $$N''_{RE}$$

represents the reference number of available REs in the slots for repeated transmission of the data channel.

Optionally, in some embodiments, the second reference RE number threshold may be 156*X, or 156, where X represents the first slot repetition factor.

Optionally, in some embodiments, the processing unit 410 may be further configured to: perform quantization and rounding on the intermediate number of information bits to determine the transport block size corresponding to the data channel.

Optionally, in some embodiments, the processing unit 410 may be further configured to:

determine a transport block size in a list of transport block sizes that is greater than or equal to the intermediate number of information bits and has a smallest difference with the intermediate number of information bits as the transport block size corresponding to the data channel.

Optionally, in some embodiments, the first slot repetition factor may be determined according to a second slot repetition factor configured by a network device.

Optionally, in some embodiments, the first slot repetition factor may be the second slot repetition factor multiplied by a first coefficient, the first coefficient being smaller than or equal to 1.

Optionally, in some embodiments, the first slot repetition factor may be configured by a network device.

Optionally, in some embodiments, the first slot repetition factor may be configured via at least one of: Radio Resource Control (RRC) signaling or Downlink Control Information (DCI).

Optionally, in some embodiments, the first slot repetition factor is determined according to the number of slots for actual repeated transmission of the data channel.

Optionally, in some embodiments, the processing unit 410 may be further configured to:

obtain the encoded information bits by performing channel coding according to the transport block size corresponding to the data channel and a number of REs in a plurality of repeated data resources scheduled by a network device.

Optionally, in some embodiments, the processing unit 410 may be further configured to:

map one redundant version of the encoded information bits successively onto the plurality of slots.

Optionally, in some embodiments, the first slot repetition factor may be smaller than or equal to a second slot repetition factor configured by a network device, the second slot repetition factor indicating a number of slots for repeated transmission of the data channel.

Optionally, in some embodiments, the device 400 may be a terminal device or a network device.

Optionally, in some embodiments, the above communication unit may be a communication interface or a transceiver, or an input/output interface of a communication chip or a system-on-chip. The above processing unit 410 may be one or more processors.

It can be appreciated that the device 400 according to the embodiment of the present disclosure may correspond to the terminal device or network device in the method embodiment of the present disclosure, and the above and other operations and/or functions of the respective units in the device 400 are provided for the purpose of implementing the process flow corresponding to the terminal device or network device in the method 300 shown in FIG. 3, and details thereof will be not omitted here for brevity.

Figure 5:
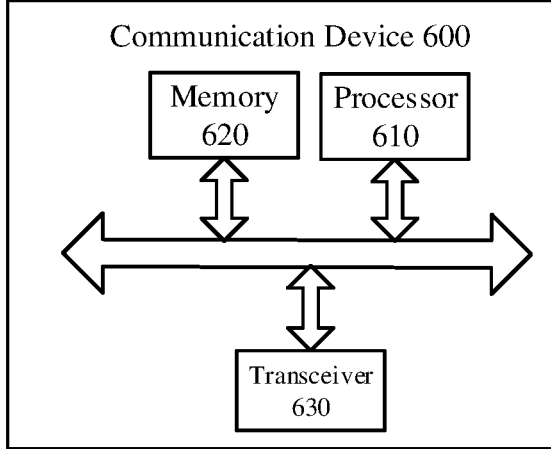
FIG. 5 is a schematic block diagram of a communication device according to an embodiment of the present disclosure.

FIG. 5 is a schematic diagram showing a structure of a communication device 600 according to an embodiment of the present disclosure. The communication device 600 shown in FIG. 5 includes a processor 610, and the processor 610 can invoke and execute a computer program from a memory to implement the method in the embodiment of the present disclosure.

Optionally, as shown in FIG. 5, the communication device 600 may further include a memory 620. The processor 610 can invoke and execute a computer program from the memory 620 to implement the method in the embodiment of the present disclosure. The memory 620 may be a separate device independent from the processor 610, or may be integrated in the processor 610.

Optionally, as shown in FIG. 5, the communication device 600 may further include a transceiver 630, and the processor

610 may control the transceiver 630 to communicate with other devices, and in particular, transmit information or data to other devices, or receive information or data transmitted by other devices.

Here, the transceiver 630 may include a transmitter and a receiver. The transceiver 630 may further include one or more antennas.

Optionally, the communication device 600 may specifically be the network device according to the embodiment of the present disclosure, and the communication device 600 may implement the corresponding processes implemented by the network device in any of the methods according to the embodiments of the present disclosure. For the sake of brevity, details thereof will be omitted here.

Optionally, the communication device 600 may specifically be the mobile terminal/terminal device according to the embodiment of the present disclosure, and the communication device 600 may implement the corresponding processes implemented by the mobile terminal/terminal device in any of the methods according to the embodiments of the present disclosure. For the sake of brevity, details thereof will be omitted here.

Figure 6:
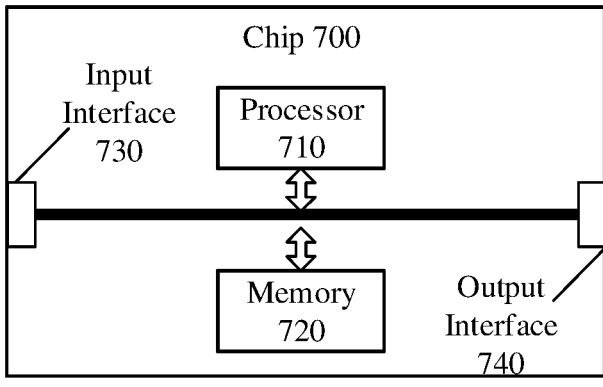
FIG. 6 is a schematic block diagram of a chip according to an embodiment of the present disclosure.

FIG. 6 is a schematic diagram showing a structure of a chip according to an embodiment of the present disclosure. The chip 700 shown in FIG. 6 includes a processor 710, and the processor 710 can invoke and execute a computer program from a memory to implement the method in the embodiment of the present disclosure.

Optionally, as shown in FIG. 6, the chip 700 may further include a memory 720. The processor 710 can invoke and execute a computer program from the memory 720 to implement the method in the embodiment of the present disclosure. The memory 720 may be a separate device independent from the processor 710, or may be integrated in the processor 710.

Optionally, the chip 700 may further include an input interface 730. The processor 710 can control the input interface 730 to communicate with other devices or chips, and in particular, obtain information or data transmitted by other devices or chips.

Optionally, the chip 700 may further include an output interface 740. The processor 710 can control the output interface 740 to communicate with other devices or chips, and in particular, output information or data to other devices or chips.

Optionally, the chip can be applied to the network device in the embodiment of the present disclosure, and the chip can implement the corresponding processes implemented by the network device in the various methods of the embodiments of the present disclosure. For the sake of brevity, details thereof will be omitted here.

Optionally, the chip can be applied to the mobile terminal/terminal device in the embodiment of the present disclosure, and the chip can implement the corresponding processes implemented by the mobile terminal/terminal device in the various methods of the embodiments of the present disclosure. For the sake of brevity, details thereof will be omitted here.

Optionally, the chip in the embodiment of the present disclosure may be a system-level chip, a system-chip, a chip system, or a system-on-chip.

Figure 7:
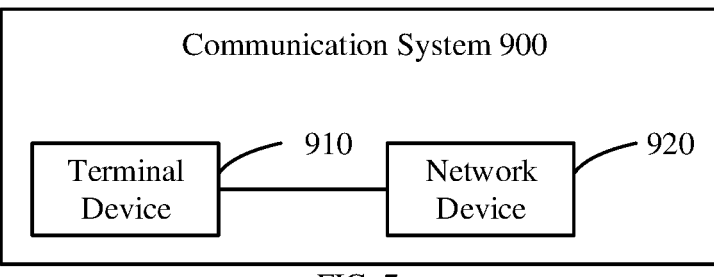
FIG. 7 is a schematic block diagram of a communication system according to an embodiment of the present disclosure.

FIG. 7 is a schematic block diagram showing a communication system 900 according to an embodiment of the present disclosure. As shown in FIG. 7, the communication system 900 includes a terminal device 910 and a network device 920. Here, the terminal device 910 can be configured to implement the corresponding functions implemented by the terminal device in the above method, and the network device 920 can be configured to implement the corresponding functions implemented by the network device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

Optionally, the computer readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A method for repeatedly transmitting data channel, comprising:
   determining a transport block size corresponding to the data channel according to a first slot repetition factor;
   obtaining encoded information bits by encoding the data channel according to the transport block size corresponding to the data channel; and
   mapping the encoded information bits onto a plurality of slots;
   wherein the mapping the encoded information bits onto the plurality of slots comprises:
   mapping one redundant version of the encoded information bits successively onto the plurality of slots;
   wherein the first slot repetition factor is a second slot repetition factor configured by a network device multiplied by a first coefficient, the second slot repetition factor indicating a number of slots for repeated transmission of the data channel.

2. The method according to claim 1, wherein said determining the transport block size corresponding to the data channel according to the first slot repetition factor comprises:

determining the transport block size corresponding to the data channel according to the first slot repetition factor and a scheduling parameter.

3. The method according to claim 2, wherein the scheduling parameter comprises at least one of:

a target number of Resource Elements (REs), a coding rate, a modulation order, or a number of transmission layers.

4. The method according to claim 2, wherein said determining the transport block size corresponding to the data channel according to the first slot repetition factor and the scheduling parameter comprises:

determining an intermediate number of information bits according to the first slot repetition factor and the scheduling parameter; and determining the transport block size corresponding to the data channel according to the intermediate number of information bits.

5. The method according to claim 4, wherein said determining the intermediate number of information bits according to the first slot repetition factor and the scheduling parameter comprises:

determining a target number of REs according to the first slot repetition factor; and determining the intermediate number of information bits according to the target number of REs and the scheduling parameter.

6. The method according to claim 5, wherein said determining the target number of REs according to the first slot repetition factor comprises:

determining the target number of REs according to the first slot repetition factor and a reference number of available REs in one slot.

7. The method according to claim 6, wherein said determining the target number of REs according to the first slot repetition factor and the reference number of available REs in one slot comprises:

determining the target number, $N_{RE}$, of REs according to:

$$N_{RE} = X \cdot \min (N, N'_{RE}) \cdot n_{PRB},$$

where X represents the first slot repetition factor, N represents a first reference RE number threshold, $n_{PRB}$ represents a number of Resource Blocks (RBs) allocated by a network device, and $N'_{RE}$ represents the reference number of available REs in one slot.

8. The method according to claim 1, wherein the first slot repetition factor is configured by a network device.

9. A communication device, comprising a processor and a memory, wherein the memory has a computer program stored thereon, and the processor is configured to invoke and execute the computer program stored in the memory to:

determine a transport block size corresponding to a data channel according to a first slot repetition factor;

obtain encoded information bits by encoding the data channel according to the transport block size corresponding to the data channel; and map the encoded information bits onto a plurality of slots;

wherein, to map the encoded information bits onto a plurality of slots, the processor is configured to:

map one redundant version of the encoded information bits successively onto the plurality of slots;

wherein the first slot repetition factor is a second slot repetition factor configured by a network device multiplied by a first coefficient, the second slot repetition factor indicating a number of slots for repeated transmission of the data channel.

10. The communication device according to claim 9, wherein said determining the transport block size corresponding to the data channel according to the first slot repetition factor comprises:

determining the transport block size corresponding to the data channel according to the first slot repetition factor and a scheduling parameter.

11. The communication device according to claim 10, wherein the scheduling parameter comprises at least one of:

a target number of Resource Elements (REs), a coding rate, a modulation order, or a number of transmission layers.

12. The communication device according to claim 10, wherein said determining the transport block size corresponding to the data channel according to the first slot repetition factor and the scheduling parameter comprises:

determining an intermediate number of information bits according to the first slot repetition factor and the scheduling parameter; and determining the transport block size corresponding to the data channel according to the intermediate number of information bits.

13. The communication device according to claim 12, wherein said determining the intermediate number of information bits according to the first slot repetition factor and the scheduling parameter comprises:

determining a target number of REs according to the first slot repetition factor; and determining the intermediate number of information bits according to the target number of REs and the scheduling parameter.

14. The communication device according to claim 13, wherein said determining the target number of REs according to the first slot repetition factor comprises:

determining the target number of REs according to the first slot repetition factor and a reference number of available REs in one slot.

15. The communication device according to claim 14, wherein said determining the target number of REs according to the first slot repetition factor and the reference number of available REs in one slot comprises:

determining the target number, NRE, of REs according to:

$$N_{RE} = X \cdot \min (N, N'_{RE}) \cdot n_{PRB},$$

where X represents the first slot repetition factor, N represents a first reference RE number threshold, $n_{PRB}$ represents a number of Resource Blocks (RBs) allocated by a network device, and $N'_{RE}$ represents the reference number of available REs in one slot.

16. The communication device according to claim 9, wherein the first slot repetition factor is configured by a network device.

17. A non-transitory computer-readable storage medium, storing a computer program that causes a computer to:

determine a transport block size corresponding to a data channel according to a first slot repetition factor;

obtain encoded information bits by encoding the data channel according to the transport block size corresponding to the data channel; and map the encoded information bits onto a plurality of slots;

wherein, to map the encoded information bits onto a plurality of slots, the computer is configured to:

map one redundant version of the encoded information bits successively onto the plurality of slots;

wherein the first slot repetition factor is a second slot repetition factor configured by a network device multiplied by a first coefficient, the second slot repetition factor indicating a number of slots for repeated transmission of the data channel.

18. The non-transitory computer-readable storage medium according to claim 17, wherein said determining the transport block size corresponding to the data channel according to the first slot repetition factor comprises:

determining the transport block size corresponding to the data channel according to the first slot repetition factor and a scheduling parameter.

\* \* \* \* \*